United States Patent
Peng et al.

(10) Patent No.: US 9,759,863 B1
(45) Date of Patent: Sep. 12, 2017

(54) WAVEGUIDE WITH GRADIENT INDEX MATERIAL ADJACENT INPUT COUPLER

(71) Applicant: Seagate Technology LLC, Cupertino, CA (US)

(72) Inventors: Chubing Peng, Eden Prairie, MN (US); Mark Ostrowski, Lakeville, MN (US); Chang Xie, Rosemont, MN (US); Tae-Woo Lee, Eden Prairie, MN (US); Lisa M. Hanson, Eagan, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/145,905

(22) Filed: May 4, 2016

(51) Int. Cl.
  G02B 6/26 (2006.01)
  G02B 6/42 (2006.01)
  G02B 6/14 (2006.01)
  G02B 6/122 (2006.01)
  G02B 6/028 (2006.01)
  G02B 6/12 (2006.01)
  G11B 5/31 (2006.01)

(52) U.S. Cl.
  CPC .......... *G02B 6/14* (2013.01); *G02B 6/0283* (2013.01); *G02B 6/1228* (2013.01); *G02B 2006/12147* (2013.01); *G11B 5/314* (2013.01)

(58) Field of Classification Search
  CPC .......... G02B 6/14; G02B 6/26; G02B 6/1228; G02B 2006/12147; G02B 2006/12152; G02B 6/0283; G02B 6/0285; G11B 5/314
  USPC .............................................. 385/31, 43, 50
  See application file for complete search history.

(56) References Cited

U.S. PATENT DOCUMENTS

| 5,696,865 | A | * | 12/1997 | Beeson | G02B 6/0281 385/124 |
| 7,068,870 | B2 | * | 6/2006 | Steinberg | G02B 6/10 385/132 |
| 8,411,536 | B1 | | 4/2013 | Peng | |
| 8,755,650 | B2 | | 6/2014 | Peng | |
| 2004/0037497 | A1 | * | 2/2004 | Lee | G02B 6/132 385/28 |
| 2013/0004119 | A1 | * | 1/2013 | Yin | G02B 6/30 385/14 |
| 2017/0123160 | A1 | * | 5/2017 | Kato | G02B 6/305 |

* cited by examiner

Primary Examiner — Robert Tavlykaev
(74) Attorney, Agent, or Firm — Hollingsworth Davis, LLC

(57) ABSTRACT

A waveguide a core extending along a light propagation and a coupling layer adjacent one side of the core along the light propagation direction. A gradient index material is adjacent to at least one side of the coupling layer. The gradient index material has a first refractive index proximate the coupling layer and a second refractive index away from the coupling layer. The gradient index material is configured to direct light from an input facet to the core layer.

19 Claims, 8 Drawing Sheets

Section 3-3

Section 3-3

WAVEGUIDE WITH GRADIENT INDEX MATERIAL ADJACENT INPUT COUPLER

SUMMARY

The present disclosure is directed to a waveguide with gradient index material adjacent an input coupler. In one embodiment, a waveguide has a core extending along a light propagation direction of the waveguide and a coupling layer adjacent one side of the core along the light propagation direction. A gradient index material surrounds at least three sides of the coupling layer. The gradient index material comprises a first refractive index proximate the coupling layer and a second refractive index away from the coupling layer. The gradient index material is configured to direct light from an input facet to the core layer.

In another embodiment, an apparatus has a mounting surface configured to receive light from a light source and a waveguide. The apparatus includes a waveguide with a core extending from the mounting surface along a light propagation direction and an input coupler adjacent one side of the core along the light propagation direction. The input coupler extends a first distance from the mounting surface to where the input coupler abuts a first cladding layer. A gradient index material is adjacent a side of the input coupler that faces away from the core. The gradient index material has a first refractive index proximate the coupling layer and a second refractive index away from the coupling layer. The gradient index material is configured to direct light from an input facet to the core layer. The gradient index material extending a second distance from the mounting surface to where gradient index material abuts a second cladding layer. The second distance is less than the first distance.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

One way to launch light into a HAMR slider is to bond a light source to an outer surface of a read/write head, or slider. Light exiting from a light source (e.g., an edge-emitting laser diode) is coupled into an optical waveguide integrated into the slider. The coupling efficiency from the light source to the waveguide is optimized by precisely positioning the light source relative to the waveguide input coupler along the mounting surface (e.g., in down- and cross-track directions) and at a distance normal to the mounting surface, e.g., the z-gap. However, by increasing the allowable laser-to-slider mounting tolerances, production yield will generally increase. Embodiments below describe HAMR slider features that facilitate increasing assembly tolerance for laser-to-slider assemblies.

Figure 1:
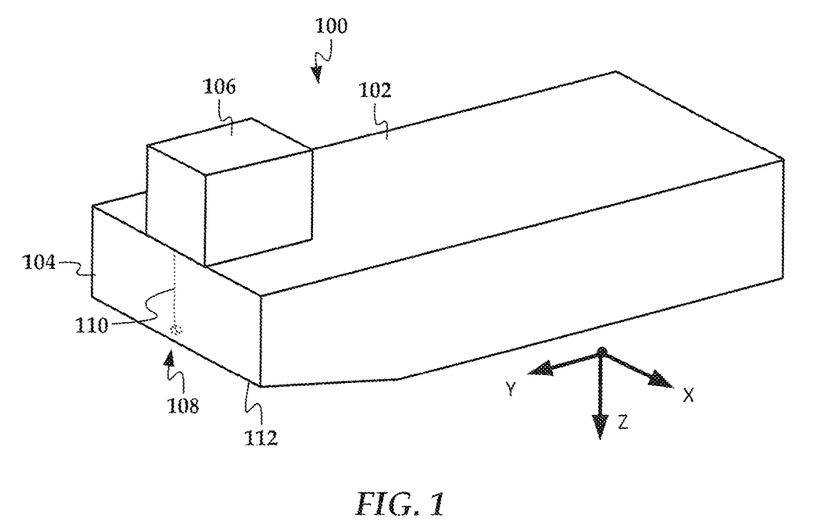
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to a near-field transducer that is part of the read/write transducers 108. The NFT achieves surface plasmon resonance and directs the energy out of a media-facing surface 112 to create a small hot spot on the recording medium.

Figure 2:
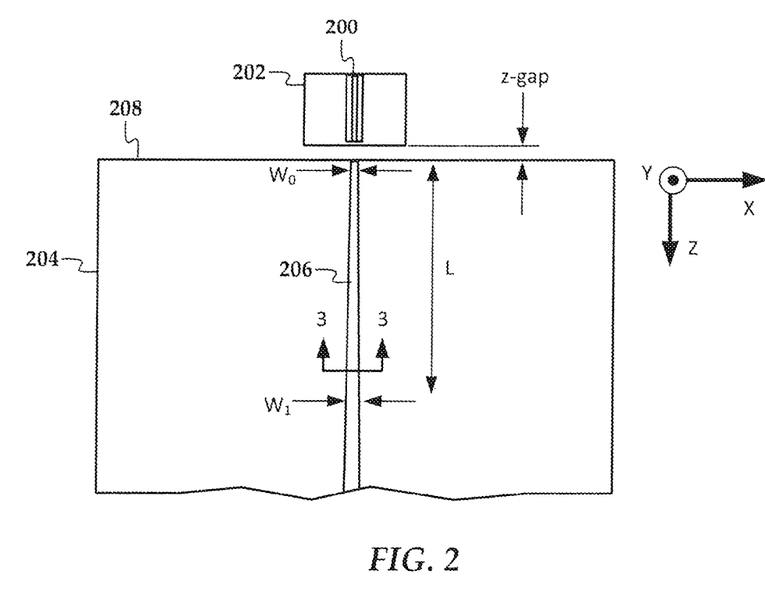
FIG. 2 is a cross-sectional view of a slider trailing edge according to an example embodiment.

In FIG. 2, a view of a slider trailing edge shows a light delivery configuration according to an example embodiment. A laser source 200, for instance, an edge-emitting laser diode, mounted on a submount 202, launches light into a waveguide on a slider 204 by way of a waveguide input coupler 206. Coupling efficiency from light source to the waveguide is maximized by optimizing the position of the light source/submount along cross- and down-track directions (x- and y-directions, respectively in these figures) and at a distance, z-gap, very close to the slider's top surface 208. The z-gap corresponds to an assembly tolerance in the light propagation direction.

Figure 3:
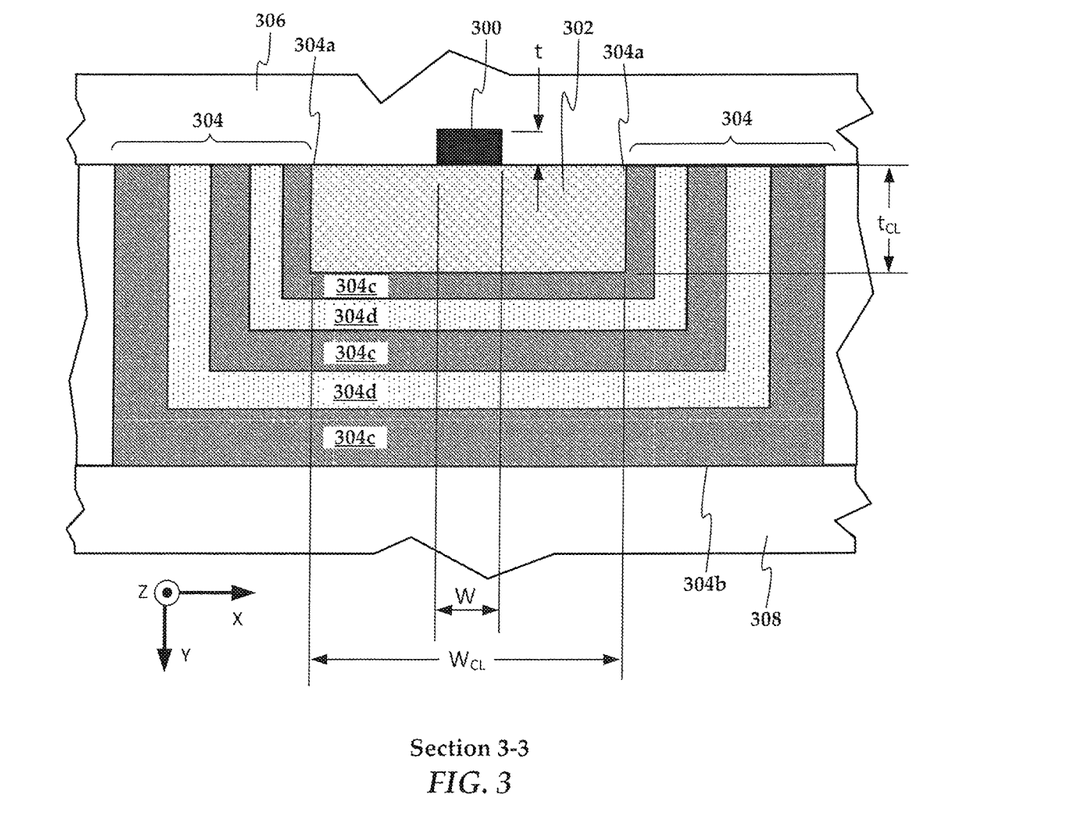
FIG. 3 is a cross-sectional view of an input coupler taken across section lines 3-3 of FIG. 2.

In FIG. 3, a cross sectional view taken across section lines 3-3 shows details of an input coupler according to an example embodiment. A channel waveguide is formed by dielectric materials to allow laser light to pass through. The channel waveguide includes a core 300, a coupler layer 302, a gradient index (GRIN) layer 304 surrounding half of the coupler layer GRIN layer 302, top cladding 306 and bottom cladding 308. The channel waveguide extends in a light propagation direction (the Z-axis direction) from the top slider surface.

The waveguide core 300 can be made of dielectric materials of high index of refraction, for instance, $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Ba_4Ti_3O_{12}$ (barium titanate), GaP (gallium phosphide), $CuO_2$ (copper oxide), and Si (silicon). The coupler layer 302 can be formed of a dielectric material having an index of refraction slightly higher than that of the bottom cladding 308 but much lower than that of the core 300, for instance, SiOxNy (silicon oxynitride), AlN (aluminum nitride) and alloys $SiO_2$—$Ta_2O_5$, $SiO_2$—ZnS, $SiO_2$—$TiO_2$. The cladding layers 306, 308 are each formed of a dielectric material having a refractive index lower than the core 300 and the coupler layer 302, for instance, $Al_2O_3$ (aluminum oxide), SiO and $SiO_2$ (silica).

The gradient index layer 304 has equal or similar effective refractive index to a refractive index of the coupler layer at the GRIN/coupler interface 304a and equal or similar effective refractive index to a refractive index to that of the cladding layer at the GRIN/cladding interface 304b. The effective refractive index of GRIN in this example decreases from the coupler layer to the cladding layer, following a parabolic or secant profile. The GRIN layer 304 can be made of a high index material 304c and a low index material 304d alternatively with an appropriate thickness. Each of the materials 304c, 304d has homogenous refractive indices within their respective layers. The local, effective refractive index of the GRIN layer 304 is a combination of the indices and thicknesses of adjacent low- and high-index materials 304c, 304d at the region of interest. The figure shows three layers of each material 304c, 304d (e.g., three bilayers) for purposes of illustration, however any number of layers/bilayers may be used.

Another way of forming the GRIN layer 304 is to gradually change materials and/or process parameters as layers are being deposited. For example, during the GRIN deposition, the composition of SiOxNy used to form the GRIN layer 304 can be changed to change the index of refraction gradually and continuously during the deposition. In any of the embodiments described herein, the GRIN layers can be formed through any of these processes.

To match the mode profile of the laser diode for efficiency, the core width (W) near the laser diode and the coupler layer (its refractive index n, thickness $t_{CL}$, and width $W_{CL}$) are optimized. As the distance away from the laser diode into the slider increases, the core width W increases (see, e.g., $W_0$ and $W_1$ in FIG. 2). Laser light is first coupled into the coupler layer and gradually transformed into the waveguide core 300 along the Z direction.

The GRIN layer 304 has weak focusing capability. As the laser diode is misaligned away from the coupler layer (in both X, or cross-track, and Y, or down-track directions), the GRIN layer bends the light rays emitting from the laser diode toward the coupler layer 302 and the light is eventually coupled into core 300. As the laser diode is positioned away from the slider (e.g., z-gap shown in FIG. 2 increases), the laser beam is divergent. The focusing capability of GRIN layer 304 compensates the laser beam wavefront to some extent and therefore, the laser light is coupled into the waveguide more efficiently.

As an example, consider a waveguide with a 120-nm thick $TiO_2$ core and $Al_2O_3$ claddings. At light wavelength $\lambda$=830 nm, the index of refraction n=2.36 for $TiO_2$ core and 1.65 for $Al_2O_3$ cladding. The laser diode is edge-emitting. The emitting light beam is TE (transverse electric) polarized, having a full-width-at-half-maximum FWHM=0.622 μm along its fast-axis direction (normal to junction) and 3.049 μm along the slow-axis direction (parallel to junction). For purposes of the illustrated example, the laser diode is oriented such that its fast-axis is along the Y direction (normal to the waveguide film plane) and its slow axis along the X direction. The excited waveguide core will be TE polarized.

For this configuration, the optimal condition for coupling efficiency is found to be: core width $W_0$=100 nm at the slider's top surface, the coupler layer n=1.70 and thickness $t_{CL}$=700 nm. The input coupler 302 has core output width $W_1$=440 nm over L=100 μm long ($W_0$, $W_1$ and L are shown in FIG. 2). At the waveguide output, the excited fundamental $TE_0$ mode has FWHM=290 nm along the X direction and 160 nm along Y direction, which are significantly different from those of the laser diode.

The GRIN layer 304 in this example is chosen to follow a hyperbolic secant profile in the index of refraction: $n(y)=n_0 \mathrm{sech}(\alpha\ y)$. Here y=0 is the distance from the coupler layer/GRIN interface, $n_0$ is equal to the refractive index of the coupler layer, $n_0$=1.70. The GRIN has a refractive index equal to that of the cladding layer at the GRIN/cladding interface, $n_1$=1.65. The coefficient α may be found by choosing the GRIN thickness $t_{GRIN}$ as shown in Equation 1 below.

$$\alpha t_{GRIN} = \ln\left[\frac{n_0}{n_1} + \sqrt{\left(\frac{n_0}{n_1}\right)^2 - 1}\right] \quad (1)$$

In this example, $t_{GRIN}$=1.8 μm, so α=0.122 (μm)$^{-1}$. Six bilayers are used to simulate the GRIN. Each bilayer has two layers, each made of silicon oxynitride with different composition. The high-index layer is $t_1$ thick and has a refractive index $n_{b1}$ equal to the coupler layer ($n_{b1}=n_0$=1.70), and the low-index layer is $t_2$ thick and has a refractive index $n_{b2}$ equal to the cladding layer, $n_{b2}$=1.65. Each bilayer is 300 nm thick, $t_1+t_2$=0.3 μm thick. The effective index of the each bilayer is determined by Equation 2 below. For TE mode, the thickness of layer 1 in the $m^{th}$ bilayer is determined by Equation 3 below.

$$n(m) = n_0\ \mathrm{sec}\ h[\alpha(m-0.5)\Delta L], m=1,2,3,\ldots,6, \Delta L = t_1 + t_2 \quad (2)$$

$$t_1 = \frac{n(m)^2 - n_{b2}^2}{n_{b1}^2 - n_{b2}^2} \quad (3)$$

Figure 4:
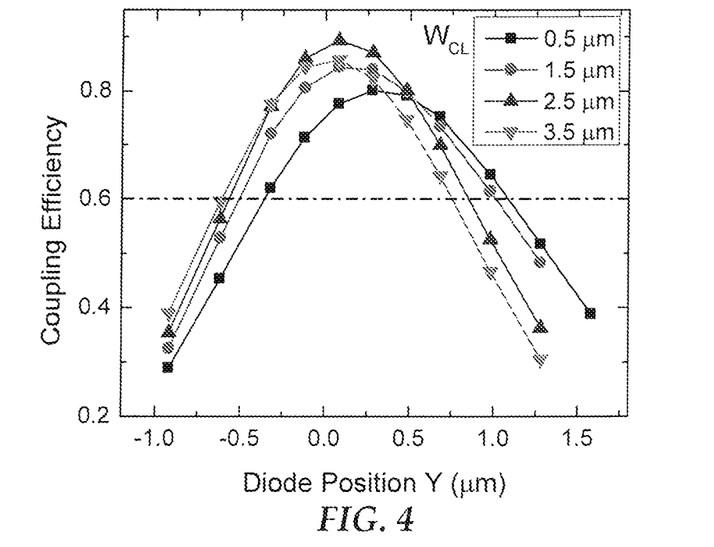
FIGS. 4, 5, and 6 are graphs showing optical simulation results of an input coupler according to an example embodiment.

For evaluating the assembly tolerance between laser light source and waveguide input coupler, the maximum positioning tolerance is defined as being those offsets from alignment where the coupling efficiency=0.6. The results for configuration with the GRIN surrounding the coupling layer are shown in the graph FIG. 4, which plots the coupling efficiency as a function of diode position along down-track direction (the Y direction) at z-gap=0. If the GRIN is only on the bottom and not the sides of the coupler layer, the coupling efficiency is maximized at the coupler layer width $W_{CL}$=4 μm. At this width, the assembly tolerance is also maximized, Δy=1.378 μm. (Without a GRIN, this positioning tolerance is Δy=0.926 μm.). For the GRIN surrounding the bottom part of the coupler layer as shown in FIG. 3, the coupling efficiency is maximized at $W_{CL}$=2.5 µm, Δy=1.419 µm, while the positioning tolerance is maximized at $W_{CL}$=1.5 µm, Δy=1.527 µm, a 10% improvement, but with a lower peak efficiency.

Figure 5:
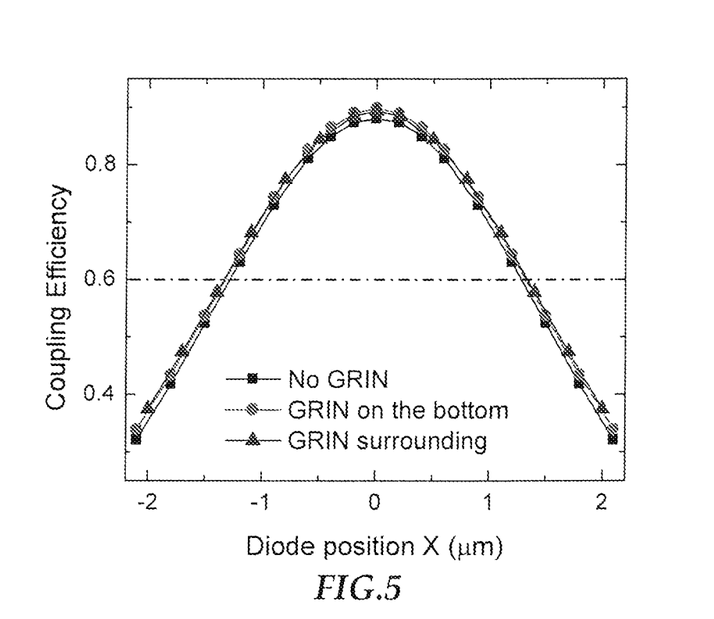

In FIG. 5, a graph shows the coupling efficiency as a function of diode position along cross-track direction (the X direction) at z-gap=0 for no GRIN, GRIN on the bottom, and GRIN surrounding the bottom and sides of the coupler layer. Three cases have similar positioning tolerance, Δx=2.688 µm. Configurations with a GRIN layer provides slightly better assembly tolerance. In some existing assembly processes, the laser can be positioned at the slider with a positioning accuracy of ±0.3 µm. So the laser can be placed in the cross-track directions with minimum loss in the coupling efficiency, because Δx is far greater than the positioning accuracy (0.3 µm). The difficulty comes from the down-track positioning. In such cases, the GRIN structure as described above gives a boost in assembly tolerance along down-track direction, which in this example is the direction of laser diode's fast-axis.

In some embodiments, the GRIN on the sides of the coupler and that on the bottom of the coupler can be independently tuned for optimal cross- and down-track assembly tolerance. For example, the thicknesses of the layers or the bilayer—surrounding the sides of the input coupler may be different than the thicknesses of the layers or the bilayer surrounding a top or bottom of the input coupler. Modeling on an actually fabricated device, which has 70% material coverage on the sides, shows 10% improvement in cross-track assembly tolerance.

Figure 6:
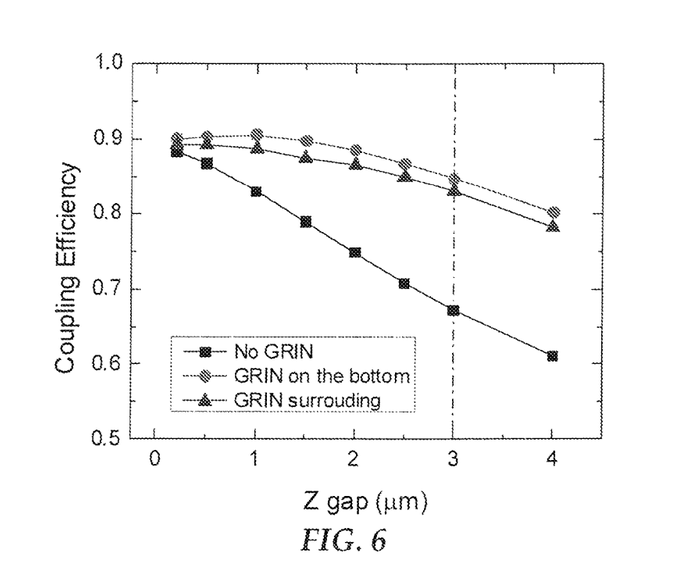

In FIG. 6, a graph shows the coupling efficiency as z-gap for three cases: no GRIN, GRIN on the bottom and GRIN surrounding the bottom and sides of the coupler layer. The curves with a GRIN are much flatter than that without GRIN, evidently due to the GRIN providing a weak focusing along the Z direction. At a z-gap=3 µm, the coupling efficiency with a GRIN is about 24% greater than that without a GRIN. It is also seen that GRIN on the bottom of the coupler layer performs slightly better than that of GRIN surrounding the coupler layer.

Figure 7:
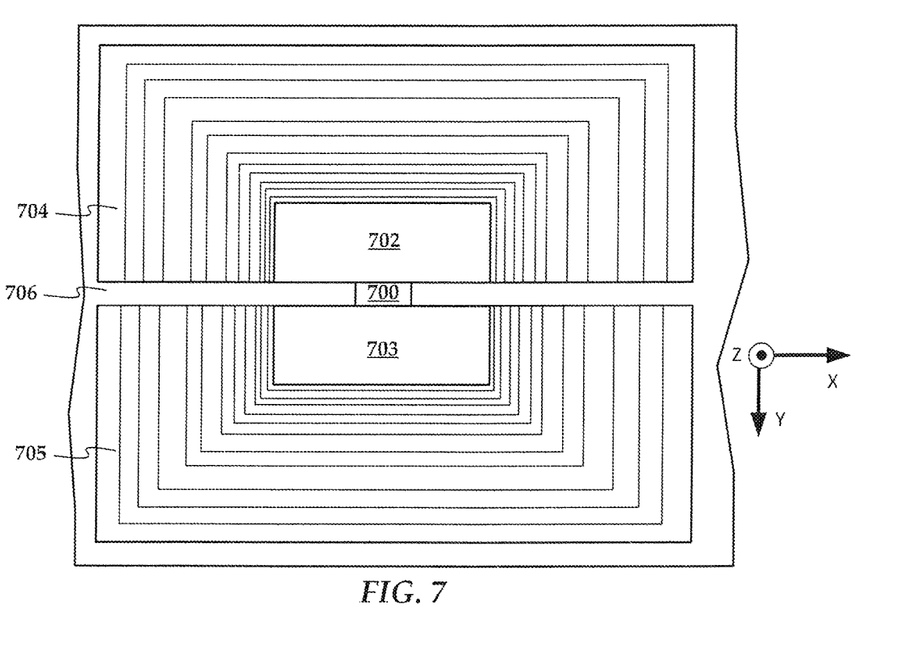
FIGS. 7 and 8 are cross-sectional views of input couplers according to additional embodiments.
Figure 8:
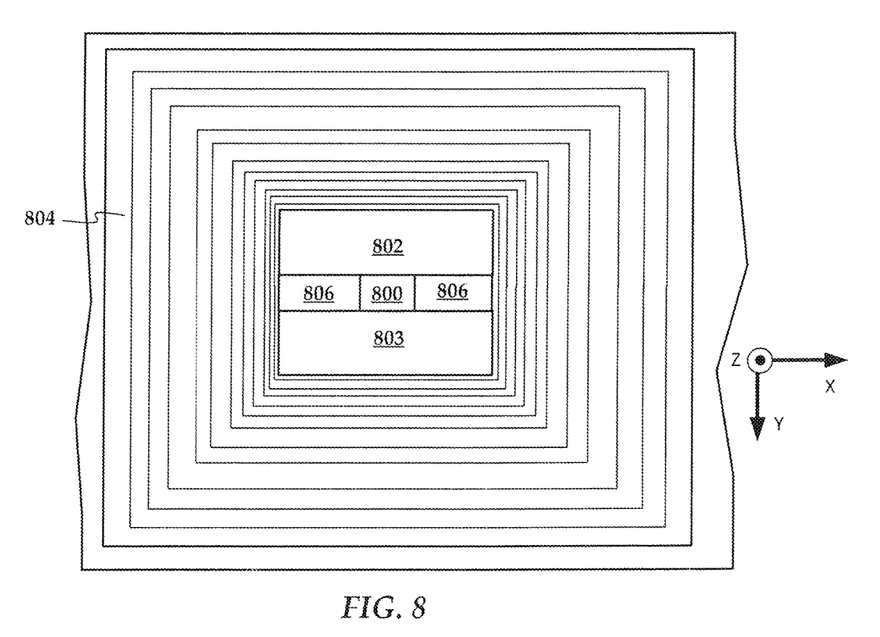

To further improve the assembly tolerance, the GRIN and the coupler layer can be on both the top and bottom of the core in other embodiments, as shown FIGS. 7 and 8. In FIG. 7, a cross sectional view (e.g., corresponding to section 3-3 in FIG. 3) shows a waveguide core 700 with coupling layers 702, 703 on top and bottom sides. Top and bottom GRIN layers 704, 705 surround the respective coupling layers 702, 703. A side cladding 706 separates the coupling layers 702, 703 and GRIN layers 704, 705, and surrounds edges of the core 700. The core 700, coupling layers 702, 703, GRIN layers 704, 705, and side cladding 706 may be configured and include the same features as described for the embodiment shown in FIG. 3. For this configuration, the down-track assembly tolerance is nearly doubled.

In FIG. 8, a cross sectional view (e.g., corresponding to section 3-3 in FIG. 3) shows a waveguide core 800 with coupling layers 802, 803 on the top and bottom. A GRIN structure 804 surrounds the coupling layers 802, 803. A side cladding 806 separates the coupling layers 802, 803 and surrounds edges of the core 800. The side cladding 806 is also enclosed by the GRIN layers 804. The core 800, coupling layers 802, 803, GRIN structure 804, and side cladding 806 may be configured and include the same features as described for the embodiment shown in FIG. 3. For this configuration, the down-track assembly tolerance is doubled.

Figure 9:
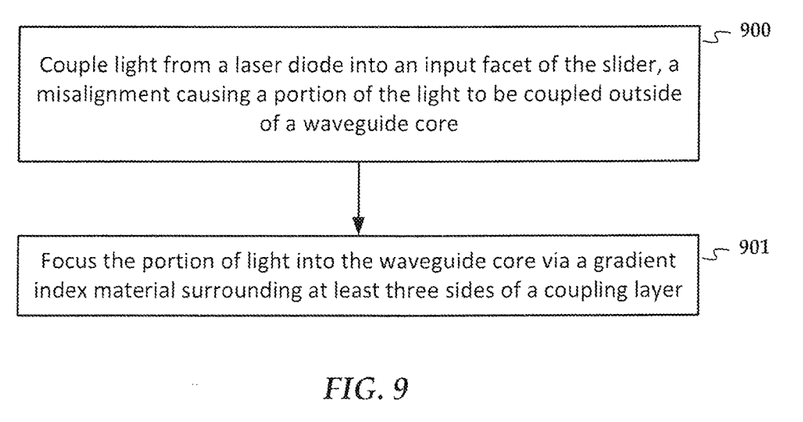
FIGS. 9 and 10 are flowcharts of methods according to example embodiments.

In FIG. 9, a flowchart shows a method according to an example embodiment. The method involves coupling 900 light from a laser diode into an input facet of a slider. The input coupler is optically coupled with a waveguide core integrated into the slider. The laser diode is misaligned relative to the input facet in at least one of a cross-track direction, a down-track direction, and the light propagation direction. The misalignment causes a portion of the light to be coupled into the slider outside of the waveguide core at the input facet. The portion of light is focused 901 into the waveguide core away from the input facet via a gradient index material surrounding at least three sides of a coupling layer. The coupling layer is adjacent one side of the core along the light propagation direction. A plurality of layers having different refractive indices may be used to simulate a gradient index material.

Figure 10:
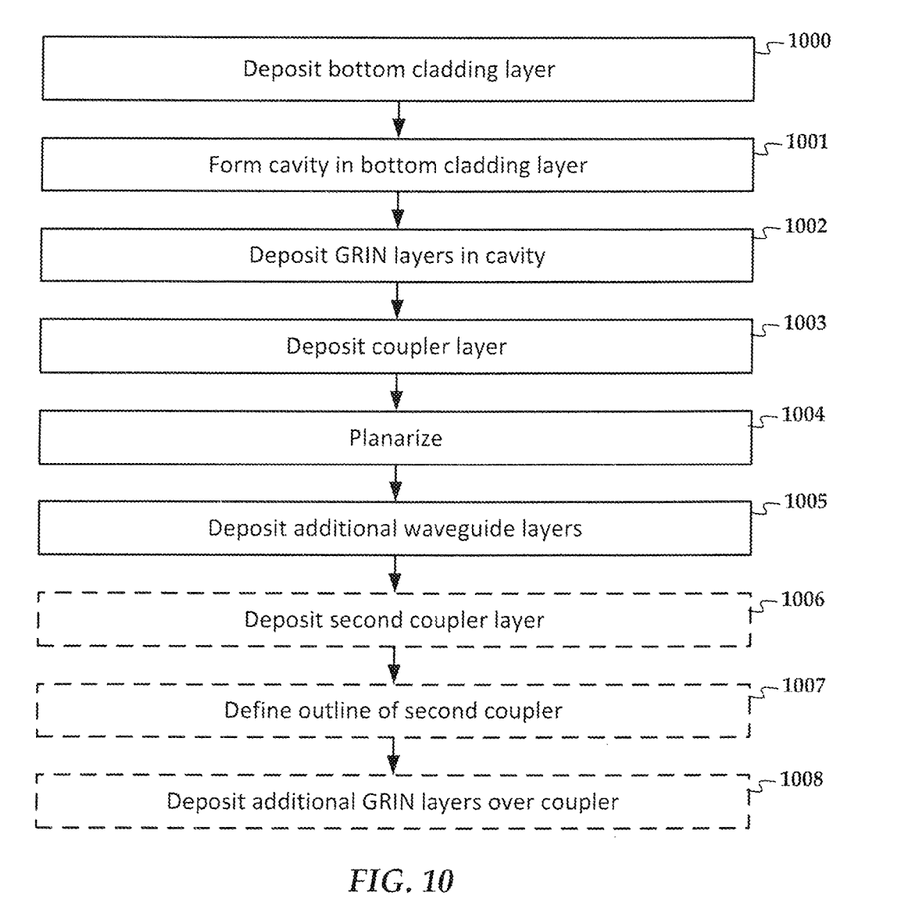

In FIG. 10, a flowchart illustrates a process for manufacturing a channel waveguide according to an example embodiment. A bottom cladding layer (which may include $SiO_2$, $Al_2O_3$ or other optical quality dielectric) is first deposited 1000, e.g., on a substrate or other material layers that are first deposited on the substrate. A cavity is formed 1001 in the bottom cladding layer by, e.g., inductively coupled plasma etching or ion milling. Within this cavity, the GRIN layers are deposited 1002 along the side walls as well as the bottom, forming the wrapped-around GRIN structure.

A coupler layer is then deposited 1003. After deposition of the coupler layer, the structured is planarized 1004 (e.g., chemical mechanical polished) to form a flat surface in preparation for depositing 1005 additional waveguide, e.g., core and top cladding layers. In some embodiments, a second coupler layer is deposited 1006 and outline defined 1007, e.g., via photoetch. Similarly, additional GRIN layers may be deposited 1008 over the second coupler to form a structure as shown in FIG. 7 or 8.

Figure 11:
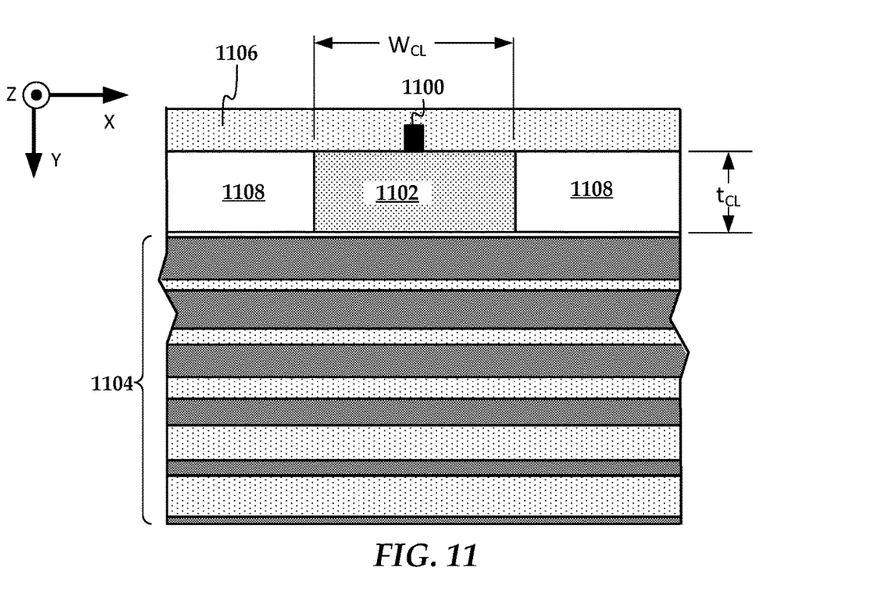
FIGS. 11 and 12 are views of an input coupler arrangement according to another example embodiment.
Figure 12:
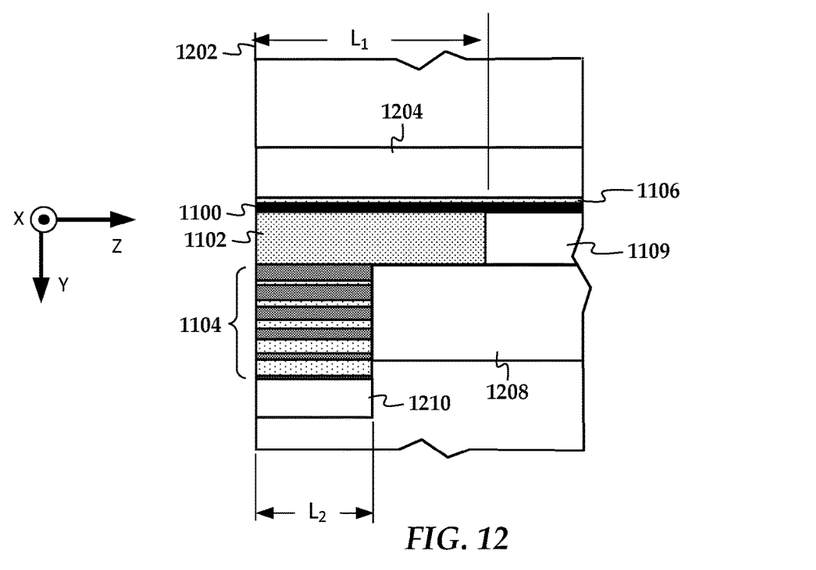

In FIGS. 11 and 12, diagrams show an input coupler arrangement according to another example embodiment. In FIG. 11, a mounting surface view at or near an input facet shows a waveguide core 1100 and an input coupler 1102. A GRIN structure 1104 is formed as planar layers beneath the input coupler, although in some embodiments may surround two sides of the input coupler 1102. The GRIN structure 1104 transitions from a first refractive index where proximate the input coupler 1102 and second refractive index away from the input coupler (e.g., near bottom cladding 1210 in FIG. 12) and the refractive index may follow a parabolic or secant profile therebetween.

In this example, the cross-track width of the GRIN structure 1104 is much larger than the cross-track width of the input coupler 1102. The shape of the input coupler 1102 projected onto the xy-plane is rectangular, and the GRIN structure 1104 may also project a rectangular shape onto this plane. Side cladding 1108 surrounds the sides of the input coupler 1102 in a cross-track direction, and side cladding layer 1106 surrounds the core 1100 in the cross-tack direction. The function of the side cladding layer 1108 with regards to the input coupler 1102 is similar to that of the side cladding 1106 of the core 1100.

The side cladding layer 1108 has a lower index of refraction than the coupler 1102, and may use the same material as side cladding 1106, or as a bottom cladding layer (e.g., layers 1208, 1210 in FIG. 12), or different materials than either. In one embodiment, $SiO_2$ can used for the side cladding layer 1108, and $Al_2O_3$ can be used for the side cladding layer 1106 as well as bottom cladding layers (e.g., layers 1208, 1210 in FIG. 12). As with other embodiments described herein, the refractive index of the input coupler is between that of the core and the cladding layers 1106, 1108. The GRIN layer 1104 is shown in this example as alternating layers of different material with different layer thicknesses. In other embodiments, a GRIN layer with similar properties may be formed using other methods described herein, e.g., changing process parameters while depositing a material that makes up the GRIN structure.

In FIG. 12, a cross-sectional view shows how the various components extend in the light propagation direction away from a mounting surface 1202. A light source (not shown) is attached to the mounting surface 1202 which receives light from the light source. The core 1100 extends away from the mounting surface 1202 in the light propagation for a relatively long distance into the slider body. The input coupler extends a first distance $L_1$ away from the mounting surface 1202 along the light propagation direction, where it abuts another cladding layer 1109. The cladding 1109 could be the same material as the side cladding 1108 of FIG. 11, or the same material as the bottom cladding 1208, or different. The choice of this material may be purported for improving the excitation efficiency of a near-field transducer.

In addition to the components shown in FIG. 11, the view in FIG. 12 shows a top cladding layer 1204 and bottom cladding layers 1208, 1210. As seen in this view, the GRIN layer 1104 extends a distance $L_2$ into the slider body, wherein it abuts bottom cladding layer 1208. The distance $L_2$ of the GRIN structure 1104 is shorter than the distance $L_1$ of the input coupler 1102. The bottom cladding layer 1210 may also extend this same distance $L_2$ away from the mounting surface 1202. In one particular embodiment, the input coupler has width $W_{CL}$ between 3.8 and 4.2 µm and thickness $t_{CL}$ of 0.6 µm. The GRIN layer distance $L_2$ along the light propagation direction in this embodiment is 50 µm.

The arrangement shown in FIGS. 11 and 12 can also be mirrored about the waveguide core 1100 similar to the embodiment shown in FIG. 8. In this case, a second coupler layer similar to 1102/1108 and a second GRIN layer similar to layer 1104 can be formed between the core layer 1106 and the top cladding 1204. In such a case, the second GRIN layer is symmetric to the GRIN layer 1104 about the xz-plane. As with the embodiment in FIG. 8, the use of a second GRIN layer and second coupler can further increase the assembly tolerance along the down-track direction, which in this example corresponds to the fast-axis direction of the laser diode.

Figure 13:
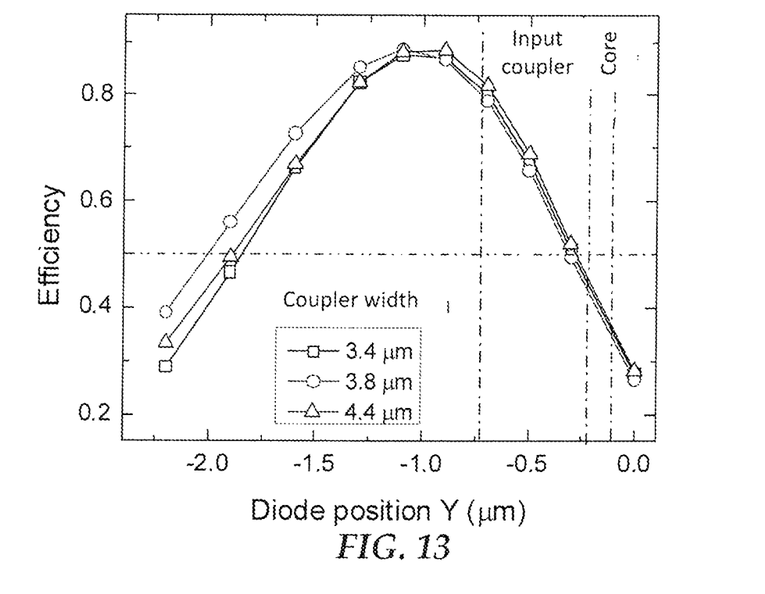
FIGS. 13 and 14 are graphs showing optical simulation results of the input coupler arrangement shown in FIGS. 11 and 12.
Figure 14:
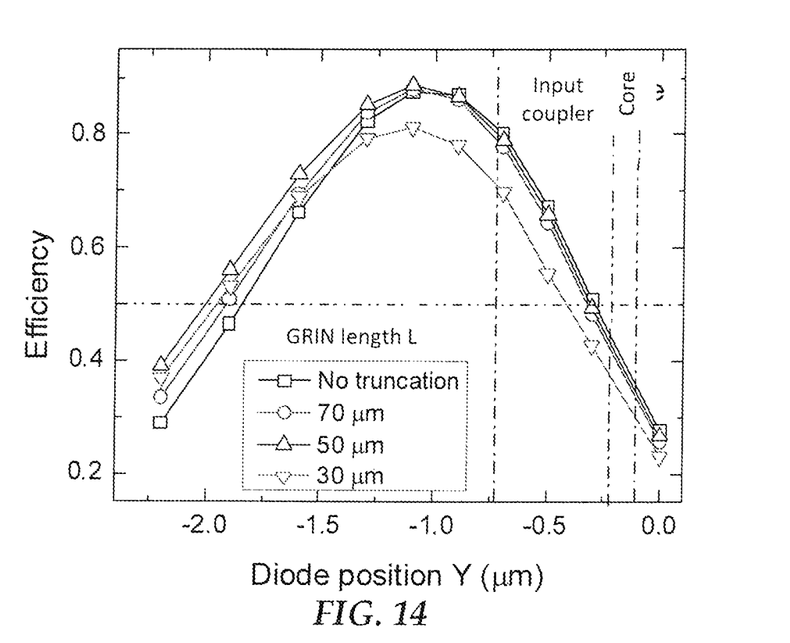

In FIGS. 13-14, graphs show simulation results for the input coupler arrangement shown in FIGS. 11 and 12. In FIGS. 13 and 14, coupling efficiency is plotted for different values of coupler width $W_{CL}$ and GRIN layer depth $L_2$, respectively. In both plots, the vertical broken lines indicate down-track boundaries of the core layer 1100, the coupler layer 1102, and the GRIN 1104. For the results in FIG. 13, the Δy at 0.5 coupling efficiency is 1.637, 1.715, and 1.58 for $W_{CL}$=4.4 µm, 3.8 µm, and 3.4 µm, respectively. Peak coupling efficiency is about 0.88 for all cases.

In summary, a GRIN-assisted waveguide input coupler provides increased assembly tolerances along fast-axis direction and at z-gap. The method of manufacture to integrate GRIN surrounding the coupler layer in waveguide is described. The GRIN layers on the sides of the coupler and that on the bottom of the coupler can be independently tuned for optimal cross- and down-track assembly tolerance. For example, the GRIN layer may have different side layer and bottom layer thicknesses.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   a waveguide comprising:
      a core extending along a light propagation direction of the waveguide, the core having a core thickness normal to a substrate of the apparatus;
      a coupling layer having a first side that is adjacent one side of the core along the light propagation direction, the coupling layer having a thickness normal to the substrate at least twice that of the core thickness; and
      a gradient index material surrounding at least three sides of the coupling layer different than the first side, wherein the gradient index material comprises a first refractive index proximate the coupling layer and a second refractive index away from the coupling layer, the gradient index material configured to direct light from an input facet to the core layer, the gradient index material increasing positioning tolerances in a cross-track and down-track direction of a light source that couples light into the core.

2. The apparatus of claim 1, wherein the gradient index material comprises a plurality of layers having different homogeneous refractive indices, the layers extend along the light propagation direction and conforming to the three sides of the coupling layer.

3. The apparatus of claim 2, wherein the layers have first thicknesses along sides of the coupling layer and different, second thicknesses along a bottom of the coupling layer, the first and second layer thicknesses selected to provide different cross-track and down-track assembly tolerances.

4. The apparatus of claim 1, further comprising:
   a second coupling layer adjacent another side of the core along the propagation length and opposite to the coupling layer; and
   a second gradient index material surrounding at least three sides of the second coupling layer, wherein the second gradient index material comprises the first refractive index proximate the second coupling layer and the second refractive index away from the second coupling layer.

5. The apparatus of claim 4, further comprising a side cladding layer between the coupling layer and the second coupling layer.

6. The apparatus of claim 5, wherein the side cladding layer extends between the gradient index material and the second gradient index material.

7. The apparatus of claim 5, wherein the gradient index material and the second gradient index material surround the side cladding layer.

8. The apparatus of claim 1, wherein the gradient index material further increases assembly tolerances of the light source in the light propagation direction.

9. The apparatus of claim 1, further comprising a bottom cladding layer surrounding the gradient index material, wherein the coupling layer has a refractive index lower than that of the core and higher than that of the bottom cladding layer, wherein the first refractive index is equal to the refractive index of the coupling layer and the second refractive index is equal to that of the bottom cladding layer.

10. The apparatus of claim 1, wherein the gradient index layer transitions from the first refractive index to the second refractive index following a hyperbolic secant profile.

11. The apparatus of claim 1, wherein the gradient index layer transitions from the first refractive index to the second refractive index following a parabolic profile.

12. The apparatus of claim 1, wherein the first side of the coupling layer is wider in a cross-track direction than the core, and wherein sides of the core that do not face the coupling layer are surrounded by a top cladding layer and a portion of the first side of the coupling layer not adjacent the core is also covered by the top cladding layer.

13. An apparatus comprising:
a mounting surface configured to receive light from a light source; and
a waveguide comprising:
a core extending from the mounting surface along a light propagation direction of the waveguide to a media-facing surface, the core having a core thickness normal to a substrate of the apparatus;
an input coupler having a first side adjacent the core along the light propagation direction, the input coupler extending a first distance in the light propagation direction from the mounting surface, the input coupler abutting a first cladding layer at the first distance, the input coupler having a thickness normal to the substrate at least twice that of the core thickness; and
a gradient index material adjacent a second side of the input coupler that faces away from the core, wherein the gradient index material comprises a first refractive index proximate the coupling layer and a second refractive index away from the coupling layer, the gradient index material configured to direct light from an input facet to the core layer, the gradient index material extending, in the light propagation direction, a second distance in the light propagation direction from the mounting surface to where the gradient index material abuts a second cladding layer, the second distance being less than the first distance, the gradient index material increasing down-track positioning tolerances of the light source.

14. The apparatus of claim 13, further comprising a bottom cladding layer adjacent a side of the gradient index material that faces away from the input coupler, wherein the input coupler has a refractive index lower than that of the core and higher than that of the bottom cladding layer.

15. The apparatus of claim 13, wherein the first cladding layer comprises a side cladding layer that also surrounds the input coupler in a cross-track direction.

16. The apparatus of claim 13, wherein the gradient index layer transitions from the first refractive index to the second refractive index following one of a hyperbolic secant profile or a parabolic profile.

17. The apparatus of claim 13, wherein the gradient index material further increases assembly tolerances between the laser diode and the input facet in the light propagation direction.

18. The apparatus of claim 13, wherein the gradient index material surrounds three sides of the input coupler, the gradient index material comprising a plurality of layers having different homogeneous refractive indices, the layers extending along the light propagation direction and conforming to the three sides of the coupling layer, wherein the layers have first thicknesses along sides of the coupling layer and different, second thicknesses along a bottom of the coupling layer, the first and second layer thicknesses selected to provide different cross-track and down-track assembly tolerances.

19. A method comprising:
coupling light from a laser diode into an input facet of a slider, the input coupler optically coupled with a waveguide core integrated into the slider, the core having a core thickness normal to a substrate of the slider, wherein the laser diode is misaligned relative to the input facet in at least one of a cross-track direction, a down-track direction, and the light propagation direction, the misalignment causing a portion of the light at the input facet to be coupled into the slider outside of the waveguide core; and
focusing the portion of the light into the waveguide core away from the input facet via a gradient index material surrounding at least three sides of a coupling layer, the coupling layer adjacent one side of the core along the light propagation direction and having a thickness normal to the substrate at least twice that of the core thickness, the gradient index material comprising a first refractive index proximate the coupling layer and a lower, second refractive index away from the coupling layer, the gradient index material increasing cross-track and down-track positioning tolerances of a light source that couples light into the core.

* * * * *